July 4, 1950 R. S. COOMBS 2,513,712
MOTOR CAR SIGNAL SYSTEM
Filed April 11, 1949
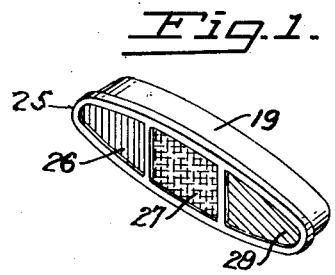
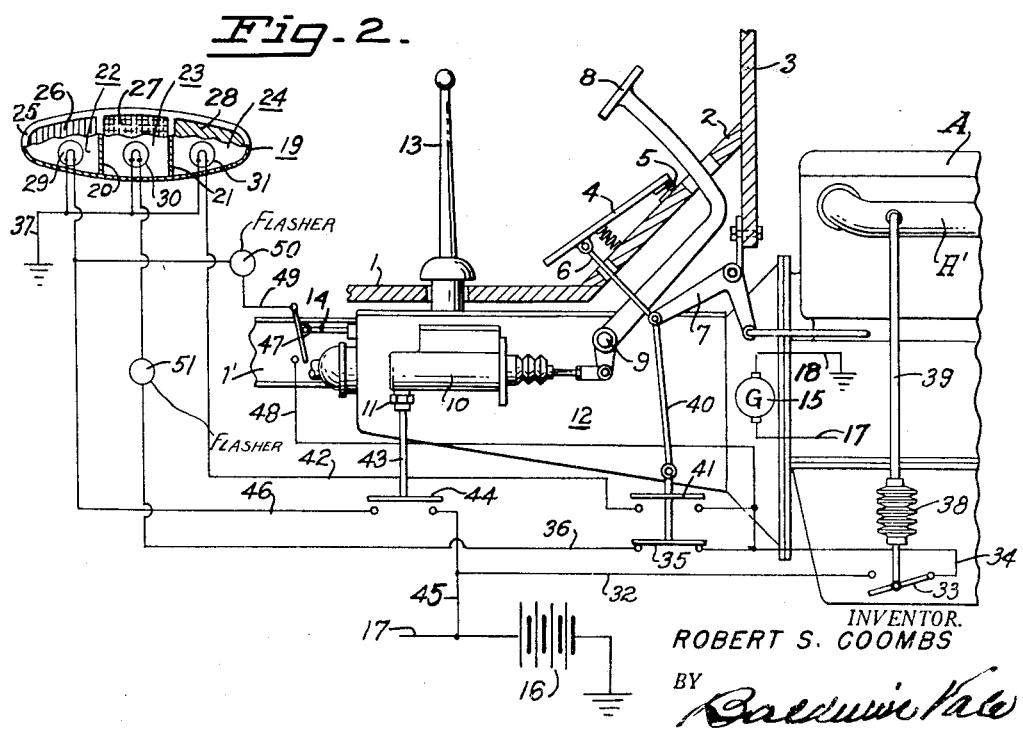
INVENTOR.
ROBERT S. COOMBS
BY Baldwin Vale
ATTORNEY Patented July 4, 1950

2,513,712

UNITED STATES PATENT OFFICE 2,513,712

MOTORCAR SIGNAL SYSTEM

Robert S. Coombs, San Francisco, Calif.

Application April 11, 1949, Serial No. 86,685

1 Claim. (Cl. 177—337)

Among the objects of the invention is the provision on the rear portion of a motor car of visual indicating means for informing the driver of a following vehicle, certain functional conditions existing in the preceding car.

Another object is to automatically indicate by visual signals any change in the manipulation of the manual controls of the motor, accelerator, brake and reverse gear of a motor car.

A further object is to interpose a vacuum operated switch in the battery circuit operated from the intake manifold of the internal combustion motor of the vehicle, so that the battery circuit will be opened when the motor is not operating and misleading signals cannot be made.

The behavior of automobile drivers at the present time of high speed, and congested traffic is unpredictable. The prescribed arm signals are not always given correctly, if at all, nor in time to avoid mishaps. The present invention informs the driver of a following car the running condition of the car ahead by automatic signals actuated by the vehicle controls.

Other objects and advantages will appear as the description proceeds. In the specification and the accompanying drawings the invention is disclosed in its preferred form. But it is to be understood that it is not limited to this form; because it may be embodied in modifications within the spirit of the invention as defined in the claim following the description.

In the one sheet of drawings:

Fig. 1 is a perspective view from the rear of the multiple signal box attached to the rear portion of an automobile body in accordance with this invention.

Fig. 2 is a diagrammatic view in vertical section of the foot and hand controls for the motive mechanism of a motor car having a wiring diagram associated therewith relating to the present invention.

Fig. 3 is a series of diagrammatic views with explanatory legends showing the color combinations of the various signals under running conditions.

In detail the structure illustrated in the drawings, Fig. 2 comprises the conventional floor board 1, the foot board 2, and the dash 3. The accelerator foot pedal 4 is pivoted at 5 to the foot board 2 and has the push rod 6 pivoted thereto and to the throttle control linkage 7 in the usual manner.

The brake pedal 8 is pivoted at 9 to gearcase of the motor A and to the brake actuating mechanism 10, which may be of any conventional form.

The hydraulic type shown has the switch actuating accessory 11 for operating the conventional stop light.

The gearcase 12 has the gear shift lever 13 or any other means for shifting gears. The sliding gear shaft 14 usually projects beyond the gearcase. The source of electric current includes the generator 15 and the battery 16, distributing through the lead wire 17 of the distributing circuit grounded at 18. Thus far the mechanism described is conventional in automotive practice with variations to meet special conditions.

This invention includes the enclosing case 19, Fig. 1, adapted to be mounted on the car body X in any suitable manner where it will be easily visible from the rear of the car. This case 19 has the partitions 20, 21, that divide it into three compartments, 22, 23, 24, see Fig. 2. The front of the case has the cover 25 in which the glass panes 26, 27, 28, are mounted and which cover their respective compartments with the colors red, yellow and green, or any other contrasting colors respectively.

Each compartment has a light bulb 29, 30, 31, respectively. These various lights are in subcircuits preferably deriving their electric current directly from the battery 16 charged by the generator 15 driven by the motor A. The yellow "caution" light 27 will function continuously while the motor A is running, except when the accelerator 4 is depressed, or the reverse gear is functioning. Current for the caution light 27 flows from the battery 16 over the wire 32, the main switch 33, the wire 34, the normally closed switch 35, the wire 36, through the lamp 30 to the ground wire 37 and the ground back to the battery 16. The main switch 33 is closed by the collapse of the bellows 38 linked thereto and collapsed by the suction within the motor intake manifold A' to which it is connected by the tube 39. When the motor stops, atmospheric pressure in the manifold permits the bellows 38 to extend and open the switch 33 as shown.

The green "go" signal 28 is illuminated and the yellow "caution" signal 27 is disconnected when the accelerator 4 is depressed, causing the link 40 to open the switch 35 and close the switch 41. Current then flows from the battery over the wire 32, the main switch 33 closed by the motor intake collapsing the bellows 38, then over the wire 34, the switch 41, the wire 42, the lamp 31, and back to the battery over the ground wire 37. When the accelerator 4 is released it opens the switch 41 and closes the switch 35 restoring the yellow "caution" signal circuit previously described.

When the foot brake 8 is depressed it advances the rod 43 which closes the switch 44. Current then flows from the battery 16 over the wire 45, the switch 44, the wire 46, the lamp 29, and back to the battery over the ground wire 37. The lamp 29 illuminates the red "stop" light 26, even when the vehicle is coasting down hill with a dead motor and the brakes on, the battery still supplying current to the signal system without the functioning of the generator 15.

When the gearshift lever 13 is thrown into reverse the protruding shaft 14 closes the switch 47 causing current to flow from the battery 16 over the wire 32, switch 33, wires 34, 48, the switch 47, wire 49, through the lamp 29 and the ground wire 37 back to the battery 16, provided the motor is running which closes the vacuum switch 33, as described.

It is preferable to combine the usual brake red "stop" signal circuit with the present brake switch 44 so that the stop signal will operate even when the car is standing still with a dead motor. This will give warning behind that the car ahead is occupied and may be operated.

Only the foot accelerator control 4 has been illustrated, but the hand throttle control, if any, is usually connected with the linkage beyond the crank 7, so that the results described in the operation of the accelerator 4, also follow manipulation of the hand throttle control, not shown.

For simplicity and clarity the electric switches in the various circuits have been symbolically indicated in the wiring diagram. There are numerous types of switches in the automotive art available for adapting this invention to the various types of motor cars in accordance with the underwriters' requirements for enclosed switches.

To accentuate the functioning of the "reverse" and "caution" signals 26, 27, the flashers 50 and 51 are interposed in these respective circuits.

Having fully described this invention and its mode of operation, what I claim and desire to secure by Letters Patent is:

In combination with a vehicle having an internal combustion motor, a motor accelerator, and a vehicle brake and a gear shift lever and an electric circuit with a source of electric power and a main switch therein; a collapsible bellows having a single chamber connected with the suction in the intake manifold of said engine and mechanically linked to said main switch for closing said switch when said motor starts and collapses said bellows and opening said switch when said motor stops; a "go" signal on said vehicle in a sub-circuit in said signal circuit and having a switch therein opened and closed by said accelerator; a "caution" signal on said vehicle in a sub-circuit in said signal circuit and having a switch therein opened and closed by said accelerator and so arranged that said "caution" signal switch is opened when said "go" signal switch is closed; and a "stop" signal on said vehicle and included in a brake sub-circuit and a gear shift sub-circuit in said signal circuit with independent "stop" switches in said brake and gear shift sub-circuits, one of said "stop" switches being opened and closed by said brake lever and the other opened and closed by said gear shift lever, independently or in unison.

ROBERT S. COOMBS.

REFERENCES CITED

The following references are of record in the file of this patent:

UNITED STATES PATENTS

| Number | Name | Date |
|---|---|---|
| 2,096,069 | Seiden | Oct. 19, 1937 |
| 2,128,769 | Finnell | Aug. 20, 1938 |
| 2,250,133 | Pearce et al. | July 22, 1944 |
| 2,463,088 | Coombs | Mar. 1, 1949 |